United States Patent [19]

Stamps et al.

[11] Patent Number: 5,437,036
[45] Date of Patent: Jul. 25, 1995

[54] TEXT CHECKING APPLICATION PROGRAMMING INTERFACE

[75] Inventors: J. Scott Stamps, Kirkland; James E. Walsh, Redmond; Jonathan M. Dubman, Bellevue, all of Wash.

[73] Assignee: Microsoft Corporation, Redmond, Wash.

[21] Appl. No.: 939,827

[22] Filed: Sep. 3, 1992

[51] Int. Cl.⁶ ............................................. G06F 9/44
[52] U.S. Cl. .................. 395/700; 364/DIG. 1; 364/280; 364/286; 364/226.1; 364/225.6
[58] Field of Search .................. 395/700, 650, 653

[56] References Cited

U.S. PATENT DOCUMENTS

| | | | |
|---|---|---|---|
| 4,136,395 | 1/1979 | Kolpek et al. | 395/144 |
| 4,587,628 | 5/1986 | Archer et al. | 364/900 |
| 4,641,274 | 2/1987 | Swank | 395/200 |
| 4,829,472 | 5/1989 | McCourt et al. | 364/419 |
| 4,949,300 | 8/1990 | Christenson et al. | 395/145 |
| 5,097,533 | 3/1992 | Burger et al. | 395/500 |
| 5,133,053 | 7/1992 | Johnson et al. | 395/200 |
| 5,146,553 | 9/1992 | Noguchi | 395/146 |
| 5,175,848 | 12/1992 | Dysart . | |
| 5,175,854 | 12/1992 | Cheung et al. | 395/650 |
| 5,179,700 | 1/1993 | Ainara et al. | 395/650 |

Primary Examiner—Kevin A. Kriess
Attorney, Agent, or Firm—Seed and Berry

[57] ABSTRACT

An application programming interface for providing functionality between an program and a text checking engine that test words from the program for correctness. A preferred embodiment of the interface includes an input buffer communicating with the program to receive text from the program. An input buffer pointer is provided for addressing the text in the input buffer. The input buffer pointer is passed to the text checking engine, which preferably is part of the API. The text checking engine performs a text checking function requested by the program and provides information responsive to the requested function. A return buffer communicates with the text checking engine to receive the responsive information from the engine. The return buffer also communicates with the program to allow the program to retrieve the responsive information from the return buffer. Preferably, a clean bit is attached to each section of text checked if no errors are found in the section of text by the engine.

39 Claims, 1 Drawing Sheet

TEXT CHECKING APPLICATION PROGRAMMING INTERFACE

TECHNICAL FIELD

The present invention relates to software programs having text processing capabilities, and more particularly, to an interface for text checking functions, such as spell checking, grammar checking, hyphenation checking and a thesaurus.

BACKGROUND OF THE INVENTION

A single computer often has several application programs, such as conventional word processors, spreadsheets, publishing programs, electronic mail and graphics programs. The computer also has one or more system programs, such as DOS, Windows, or Pen-based programs. Some or all of these programs may require or simply benefit from some text processing capabilities. Among the many text processing capabilities are text checking functions, such as spell checking, grammar checking, hyphenation checking and a thesaurus.

Currently, each program with text processing capabilities has its own text checking functions incorporated into its main program. Often the text checking functions for each program are substantially identical, resulting in unnecessarily duplicative storage. Many text checking functions are memory intensive, which results in a greatly increased need for additional memory space to store the application programs.

To stay apace the highly competitive software market, the producers of a program must constantly update the program. When a producer of a current program desires to update one of its text checking functions, it must produce a new version of its entire program. Conversely, when the producer desires to update its program, it must include code for the text checking functions, even if there is no change in the text checking functions.

SUMMARY OF THE INVENTION

The present invention provides an interface between programs and engines that provides text checking functions. A preferred embodiment of the interface allows several programs to share the use of one or more text checking engines. The interface allows each program to be updated without updating the text checking engines. Similarly, the interface allows each text checking engine to be updated without updating the programs.

A preferred embodiment of the present invention is directed to an application programming interface (API) that is capable of providing text checking functionality to a plurality of programs. An input means provides access to text from the program to the API. Preferably, the input means includes an input buffer that communicates with a program to receive text from the application program. An input buffer pointer is provided for addressing the text in the input buffer. The input buffer pointer is passed to a text checking engine, which preferably is part of the API. The text checking engine performs a text checking function requested by the application program and provides information responsive to the requested function. A return buffer communicates with the text checking engine to receive the information from the engine together with other information provided by the API. The return buffer also communicates with the program to allow the program to retrieve the responsive information from the return buffer. Preferably, a clean bit is attached to each group of words checked if no errors are found in the group by the engine.

DETAILED DESCRIPTION OF THE INVENTION

Figure 1:
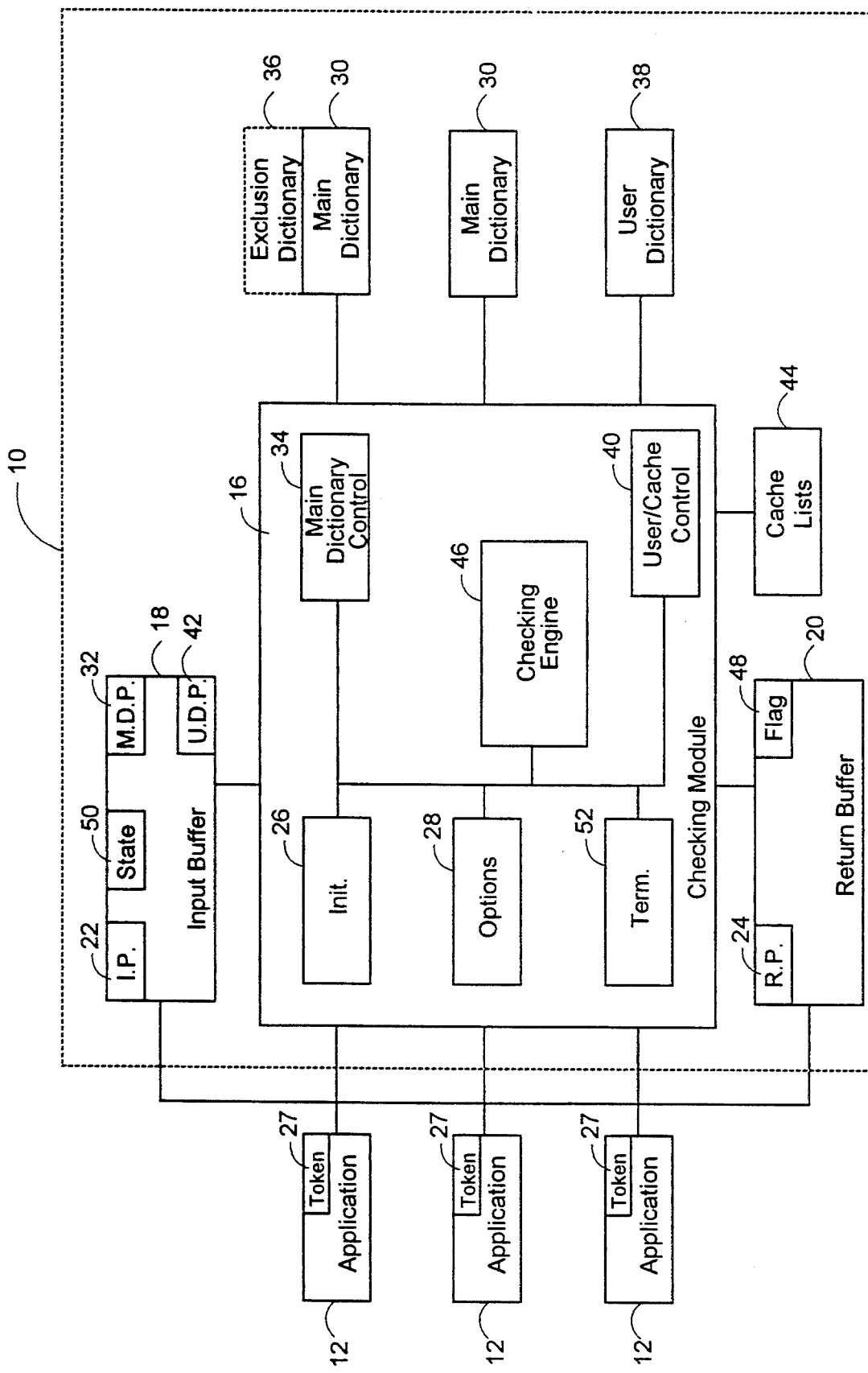
FIG. 1 is a block diagram of a text checking application programming interface according to the present invention.

Shown in FIG. 1 is a preferred embodiment of a text checking application programming interface (API) 10 of the present invention. The API 10 is an interface capable of providing text checking functionality for a plurality of programs 12. The text checking functionality can be spell checking, grammar checking, hyphenation checking, thesaurus checking, and any other text processing functions. The programs can be system programs, application programs for text processing, publishing, electronic mail, and any other programs that can advantageously employ text checking functions provided by the API.

One embodiment of the API 10 includes a checking module 16, an input buffer 18, and a return buffer 20. The input buffer is a block of memory that receives text to be checked from any one of the program 12. The return buffer is a block of memory that stores information to be passed to the program in response to the text checking functions requested. The checking module includes a set of routines that performs the actions required for text checking, each of the routines being callable by any of the programs.

The input buffer 18 is created by the program 12 that is calling the checking module 16, and is never modified by the checking module. The input buffer contains text from a document to be checked, and a list of dictionaries to be used for that check. The input buffer is accessed using an input pointer 22 that is passed to the checking module by the calling program.

The return buffer 20 is also created by the calling program, and although it is updated by the checking module 16, it is never resized by the checking module. The return buffer can include an index into the input buffer 18 where an error was found, a correction string for a "change always" correction, hyphenation information, or some processing flag. The return buffer is accessed by a return pointer 24 that is passed to the checking module by the calling program. After the words in the input buffer are checked, the calling program accesses the information returned to the return buffer using the return pointer.

A text checking session starts with a call to an initialization routine 26. The initialization routine initializes internal structures and resources needed for subsequent calls into the interface. For instance, Ignore Always, Change Once, and Change Always ram cache lists are initialized using the initialization routine, and can be manipulated after this call as discussed below.

In a preferred embodiment, the initialization routine passes a calling program identifier or token to each calling program upon successful initialization. The token should uniquely identify each calling program, e.g., if there a four copies of a program, each copy may call the API and receive a separate token. When the calling program makes subsequent calls to one of the routines in the module, the calling program passes its token to the routine. The token provides the called routine with an identification of which program is calling the routine. Preferably, each routine in the module is unable to process a call unless the call is accompanied by a valid token. By issuing such a token, the API allows several programs to access the API without returning information to an incorrect calling program.

Preferably, each calling program passes state information for the calling program to the initialization routine when starting a text checking session. The initialization routine stores the state information in a memory block. A pointer or handle to the memory block becomes the token that is passed to the calling program. When a subsequently called routine receives the token, the routine can access the state information referred to by the token.

In order to allow the various text checking options supported by the API to be chosen by a user, the checking module 16 includes an options routine 28. The options supported by the API vary with the nature of the checking module. For instance, if the checking module provides spell checking functions, the options could include, suggestion list generation, rating the suggestions in the suggestion list, finding uncapitalized sentences, finding missing or extra spaces, etc. Non-spelling options may include hyphenation checking, thesaurus checking, and grammar checking. The non-spelling options may include further options, such as varying the strictness with which the user desires the document to be grammar checked.

The API includes one or more main dictionaries 30 that supply information used in text checking. The content of each dictionary may vary according to the text checking function with which it is associated. For example, a dictionary for spell checking includes representations of numerous correctly spelled words. A dictionary for grammar checking may include numerous words, each being associated with its part of speech, verb tense, etc. A dictionary for thesaurus checking may include numerous words, each being associated with other words of similar meaning. Further, each dictionary may vary according to language and number of entries. Such dictionaries are well known and available in the art.

The input buffer 18 receives from the application program a pointer 32 to an array of main dictionaries 30, which specifies which main dictionaries are to be used to verify the text in the buffer. The main dictionary pointer is passed to a set of main dictionary control routines 34 that opens the main dictionaries specified by the pointer. Alternatively, the main dictionaries may already have been opened by another calling program. The main dictionaries remain open for all subsequent text checks until the dictionaries are closed using one of the dictionary control routines or a termination routine as discussed below.

An exclusion dictionary 36 can be associated with each main dictionary. If text being checked is found in the exclusion dictionary, it is flagged as incorrect even if it is also found in the associated main dictionary. For example, if a user habitually types "pun" instead of "pin," the user may enter "pun" in an exclusion dictionary. Each time the user spell checks "pun" it will be flagged even thought "pun" is probably in the associated main dictionary.

The API includes one or more user dictionaries 38 that supply information used in text checking. The content of each user dictionary is entered by a user using a routine from a set of user dictionary control routines 40. Like the main dictionaries, the user dictionaries may vary according to the text checking function with which it is associated.

The input buffer 18 also receives from the calling program a pointer 42 to an array of user dictionaries 38, which specifies which user dictionaries to use when processing the text, and also the order in which dictionaries are to be used. The user dictionary pointer is passed to the set of user dictionary control routines 40, one of which opens the user dictionaries specified by the pointer. Alternatively, the user dictionaries may already have been opened by another calling program. This pointer should only reference valid user dictionaries and should not include any specific reference to ram cache word lists, or to exclusion dictionaries.

The API 10 preferably includes a plurality of ram cache lists 44 that are similar to the user dictionaries 38, except are not saved between text checking sessions. The ram cache lists keep track of temporary parameters specified by a user. When spell checking, ram cache lists are established for "Ignore Always," "Change Always," and "Change Once," the meaning of each being clear to those who have used a spell checker. When grammar checking, cache lists can be established to temporarily ignore certain grammar rules either once or every time the rule is applicable. The cache lists are handled similarly to user dictionaries in that both can be reset, added to, or deleted from using the user dictionary control routines 40. Preferably, the cache lists are automatically opened at the beginning of each text checking session.

After performing the initialization routine 26 and options setting routine 28, and opening the main and user dictionaries with the dictionary control routines 34 and 40, the API is ready to perform text checking with a checking engine 46. The checking engine may be part of the API as shown in FIG. 1, or it may be a separate entity that is accessed by the API. The engine checks text that is stored in the input buffer 18 using the specified main and user dictionaries until the entire buffer is verified, or until an error is found.

When a problem portion of text is found, the return buffer 20 is modified to reference the position and length of the text in the input buffer. In addition, a flag field 48 in the return buffer is set to identify the type of error found, or set to indicate that no errors were found in the input buffer.

In order for the API to retain state information for checking for repeat words and capitalization of initial words in a sentence, the input buffer 18 includes a state field 50. If an application chooses to perform these checks instead of the API performing them, then the state field is cleared. There are three basic states, hence three bitfield definitions, that the state field is designed to handle. The basic states are: starting a text check session, continuing a text check from where the last text check stopped, and continuing a text check after a user specified "Ignore," or a "Change Always" edit. The three bits are referred to herein as a start bit, a continued bit, and an edited bit respectively.

When the API is first called, typically starting at the beginning of the document, the continued bit is cleared, and the start bit is set, indicating that the buffer in the input buffer should be the start of a sentence. The start bit should only be set when the continued bit not set, and only when the program "knows" that the beginning of a buffer of text should be the start of a sentence. After the first call to the checker, the continued bit would then be set, which implicitly causes the start bit to be ignored; however, it is best to clear this bit anyway. Unless the program jumps around in a document (for instance jumping to a sub-document to process a footnote) or changes dictionaries, such as for multilingual checking, the continued bit would stay set for the entire duration of the text check.

When the API flags text, either because it is unknown or because it is part of a "Change Pair" association, the point of processing preferably is considered to be up to but not including the flagged text. If this text is accepted by the user (user hits ignore or ignore all), or if the program makes the change substitution, then a special call should be made into the text checking engine with the text being ignored or the text substituted, after setting the edited flag in the state field of the input buffer. This flag tells the API not to verify this text, and not to process it for additional substitutions. The API does, however, check the text for repeated words and sentence capitalization. Once this text has been processed, the program clears the edited flag, and continues processing the rest of the document.

One of the options provided by the API 10 is the generation of a suggestion list of possible replacements for an error detected by the text checking engine 46. When the text checking engine detects an error, such as a misspelled word or a grammatically incorrect sentence, control returns to the calling program 12. The program can then request the options routine 28 to set a suggestions list bit and cause the text checking engine to generate a suggestion list. The suggestion list generated is passed to the return buffer 20, from where it is read by the program and displayed to the user. Preferably, suggestions will be automatically capitalized if the original text passed in for suggestions is capitalized or if the option of finding uncapitalized sentences is set and the error begins a sentence. The entire generation process should not put duplicate suggestions into the return buffer between calls for more suggestions.

The order of the list is preferably from the quickest and most likely alternatives, to less accurate and more obscure suggestions. In addition, when a request for suggestions is made, the calling program can also request that each suggestion be given an associated "rating." This rating can be a number from 1 to 255 that attempts to identify how likely the suggestion is correct. The number is not always completely meaningful, but is meant as a generalized method of giving some information to a calling program that may choose to use it. Ratings are turned on using the options routine 28.

Another option provided by the API is the ability to mark a section of text as "clean" after the section has been text checked and found correct. If the text section has already been found correct there is no need to recheck the section when rechecking the rest of the document, unless text in the section has been changed. The clean bits for each correct text section in a document are saved along with the document, so that if the document is checked, saved, closed and reopened, it can be checked again very quickly by skipping clean text sections.

An identifier specifying which main dictionary 30 was in use during text checking is saved along with the document. This way one can determine if the main dictionary was switched while the document was closed. If this happens, the entire document is marked dirty to allow checking with the new main dictionary.

Preferably, the text section is marked clean only it had no errors and did not require a user dictionary to establish correctness. If the group required a user dictionary hit, it is marked dirty because user dictionaries are volatile, i.e., the contents of the user dictionaries may be changed between spell checks. Further, each user can have a different user dictionary, so that a text section that is error-free for one user may have an error for another user.

In order to end a text checking session a termination routine 52 is provided as part of the checking module. The termination routine will attempt to close all dictionaries, free the ram cache lists, write out any other cached information, and free up any and all other resources allocated by the API since the initialization routine 26 was called. This routine should not be called if the initialization routine was not called successfully. Unless the termination routine is called, the checking module remains active and callable, and the ram cache lists are still active.

The API provides a force termination bit, that when set, forces the termination routine to succeed. If the force termination bit is not set, the termination routine may fail. For example, there may be errors writing the user dictionaries out to disk. An error code returned to the return buffer will provide information on why the termination failed.

Preferably, after this routine has been called (whether it succeeds or fails), all other routines are unusable (with the exception of the termination routine) until the module is successfully reinitialized using the initialization routine. If the termination routine fails, then successful re-initialization of the module is not guaranteed on all platforms. In addition, failure to successfully terminate each text checking session may lock memory and file resources in an unrecoverable way until the termination routine is successful. If the termination routine fails, then the calling program should either fix the problem (e.g., insert floppy in drive) and try to terminate again, or should terminate using the force terminate bit.

Those skilled in the art will appreciate that there are alternative ways of providing the API with access to the text to be checked from the programs other than using an input buffer. For example, the calling program may pass a pointer directly to the API, the pointer providing a direct link to the position in memory at which the text to be checked is stored as part of an entire document. The means used need only be such as to allow a plurality of programs to access the API, although not necessarily simultaneously.

It will be appreciated that, although specific embodiments of the invention have been described herein for purposes of illustration, various modifications may be made without departing from the spirit and scope of the invention. Accordingly, the invention is not limited except as by the appended claims.

What is claimed is:

1. An application programming interface capable of providing text checking functionality for a plurality of programs, comprising:
   an input buffer communicating with a calling program to receive text from the calling program;
   an input buffer pointer for addressing the text in the input buffer; and
   a text checking module capable of being addressed by the plurality of programs, the module being in communication with the calling program and the input buffer, wherein the module includes means, in response to a request for a text checking function from the calling program, for causing the requested function to be performed on the text in the input buffer using the input buffer pointer and for producing information responsive to the requested function using a same process context used by the calling program.

2. The interface of claim 1, wherein the module includes an initialization routine that passes a calling program identifier to the calling program, the calling program identifer being passed by the calling program to the module when making subsequent calls into the module.

3. The interface of claim 2, wherein the calling program identifier includes a pointer or handle to a memory block that stores state information regarding the calling program, the pointer or handle allowing the module to access the state information for use in providing text checking functionality for the calling program.

4. The interface of claim 1, further including a return buffer communicating with the module and the calling program to receive the responsive information from the module and allow the calling program to retrieve the responsive information from the return buffer.

5. The interface of claim 1 further including a user dictionary in communication with the module, the module causing the user dictionary to be employed in performing the requested function.

6. The interface of claim 1 further including a main dictionary in communication with the module, the module causing the main dictionary to be employed in performing the requested function.

7. The interface of claim 1 further including an exclusion dictionary in communication with the module, the module causing the exclusion dictionary to be employed in performing the requested function.

8. The interface of claim 1, further including a main dictionary that includes representations of a plurality of correctly spelled words and wherein the text checking module includes or is coupled to a speller engine that compares the text with the correctly spelled words in the main dictionary.

9. The interface of claim 1, wherein the text checking module includes or is coupled to a grammar engine that checks the grammar of the text in the input buffer and provides information regarding whether the grammar is correct.

10. The interface of claim 1, wherein the text checking module includes a means for providing one or more suggestions for changes to the text in the input buffer to the calling program.

11. The interface of claim 1, wherein the module includes an options routine that receives a request for an optional function from the calling program and activates the module to cause the requested optional function to be performed.

12. An application programming interface capable of providing text checking functionality for a plurality of programs, comprising:
    an input means for providing access to text from a calling program; and
    a text checking module capable of being addressed by the plurality of programs, the module being in communication with the calling program and the input means, wherein the module includes means, in response to a request for a text checking function from the calling program, for causing the requested function to be performed on the text from the calling program using the input means and for producing information responsive to the requested function using a same process context used by the calling program.

13. The interface of claim 12, wherein the module includes an initialization routine that passes a calling program identifier to the calling program, the calling program identifier being passed by the calling program to the module when making subsequent calls into the module.

14. The interface of claim 13, wherein the calling program identifier includes a pointer or handle to a memory block that stores state information regarding the calling program, the pointer or handle allowing the module to access the state information for use in providing text checking functionality for the calling program.

15. The interface of claim 12, wherein the input means includes an input buffer communicating with the calling program to receive the text from the calling program.

16. The interface of claim 15, further including a return buffer communicating with the module and the calling program to receive the responsive information from the module and allow the calling program to retrieve the responsive information from the return buffer.

17. The interface of claim 12 further including a user dictionary in communication with the module, the module causing the user dictionary to be employed in performing the requested function.

18. The interface of claim 12 further including a main dictionary in communication with the module, the module causing the main dictionary to be employed in performing the requested function.

19. The interface of claim 18, wherein the main dictionary includes representations of a plurality of correctly spelled words and the text checking module includes a speller engine that compares the text with the correctly spelled words in the main dictionary.

20. The interface of claim 12 further including an exclusion dictionary in communication with the module, the module causing the exclusion dictionary to be employed in performing the requested function.

21. The interface of claim 12, wherein the text checking module includes or is coupled to a grammar engine that checks the grammar of the text and provides information regarding whether the grammar is correct.

22. The interface of claim 12, wherein the module includes an options routine that receives a request for an optional function from the calling program and activates the module to cause the requested optional function to be performed.

23. The interface of claim 12, wherein the module includes a text checking engine that performs the requested function on the text and provides information responsive to the requested function.

24. A method of providing an application programming interface capable of providing text checking functionality for a plurality of programs, comprising:
    receiving text from a calling program in to an input buffer that is in communication with the calling program;
    addressing the text in the input buffer using an input buffer pointer;
    passing the text from the input buffer to a text checking engine using the input buffer pointer, the test checking engine being addressable by a plurality of programs;

requesting the engine to perform a text checking function;

using the engine to perform the requested function and produce information responsive to the requested function using a same process context used by the calling program;

receiving the responsive information from the engine in a return buffer communicating with the text checking engine; and passing the responsive information from the return buffer to the calling program.

25. The method of claim 24 wherein the text checking function performed includes spell checking the text passed from the input buffer.

26. The method of claim 24 further including providing a user dictionary in communication with the engine, the engine employing the user dictionary to perform the requested function.

27. The method of claim 24 further including providing a main dictionary in communication with the engine, the engine employing the main dictionary to perform the requested function.

28. The method of claim 24, wherein the text checking function performed includes grammar checking the grammar of the text in the input buffer.

29. The method of claim 24 further including attaching a clean bit to a section of the text if no mistakes were found in the section of text by the text checking engine.

30. The method of claim 29 further including preventing text checking of the section of text having a clean bit until the section of text is changed.

31. The method of claim 24 further including passing a calling program identifier from the interface to the calling program and passing the calling program identifier back to the interface when making subsequent calls to the interface.

32. A method of providing an application programming interface capable of providing text checking functionality for a plurality of programs, comprising:

accessing text from a calling program;

passing from the calling program to a text checking engine a request to perform a text checking function on the accessed text, the engine being addressable by a plurality of programs; and performing the requested function on the accessed text using the text checking engine using a same process context used by the calling program.

33. The method of claim 32 wherein the text checking function performed includes spell checking the text passed from the input buffer.

34. The method of claim 32 further including providing a user dictionary in communication with the engine, the engine employing the user dictionary to perform the requested function.

35. The method of claim 32 further including providing a main dictionary in communication with the engine, the engine employing the main dictionary to perform the requested function.

36. The method of claim 32 wherein the text checking function performed includes grammar checking the grammar of the text in the input buffer.

37. The method of claim 32 further including attaching a clean bit to a section of the text if no mistakes were found in the section of text by the text checking engine.

38. The method of claim 37 further including preventing text checking of the section of text having a clean bit attached until the section of text is changed.

39. The method of claim 32 further including passing a calling program identifier from the interface to the calling program and passing the calling program identifier back to the interface when making subsequent calls to the interface.

* * * * *